United States Patent
Kulon et al.

(10) Patent No.: US 12,340,467 B2
(45) Date of Patent: Jun. 24, 2025

(54) GENERATING THREE-DIMENSIONAL OBJECT MODELS FROM TWO-DIMENSIONAL IMAGES

(71) Applicant: Snap Inc., Santa Monica, CA (US)

(72) Inventors: Dominik Kulon, London (GB); Riza Alp Guler, London (GB); Iason Kokkinos, London (GB); Stefanos Zafeiriou, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/760,424

(22) PCT Filed: Feb. 17, 2020

(86) PCT No.: PCT/GB2020/050371
§ 371 (c)(1),
(2) Date: Aug. 9, 2022

(87) PCT Pub. No.: WO2021/165628
PCT Pub. Date: Aug. 26, 2021

(65) Prior Publication Data
US 2023/0070008 A1  Mar. 9, 2023

(51) Int. Cl.
*G06T 17/20* (2006.01)
*G06T 3/40* (2006.01)
*G06T 7/00* (2017.01)

(52) U.S. Cl.
CPC ............. *G06T 17/20* (2013.01); *G06T 3/40* (2013.01); *G06T 7/97* (2017.01); *G06T 2207/20081* (2013.01); *G06T 2207/20084* (2013.01)

(58) Field of Classification Search
CPC .. G06T 17/20; G06T 7/97; G06T 2207/20081
See application file for complete search history.

(56) References Cited

U.S. PATENT DOCUMENTS

2020/0363815 A1* 11/2020 Mousavian ............... G06T 7/75
2021/0043110 A1*  2/2021 Jung ....................... G10L 15/24

FOREIGN PATENT DOCUMENTS

| CN | 108305229 | 7/2018 |
|---|---|---|
| CN | 110163974 | 8/2019 |

(Continued)

OTHER PUBLICATIONS

"International Application Serial No. PCT/GB2020/050371, International Search Report mailed Nov. 18, 2020", 7 pgs.

(Continued)

*Primary Examiner* — Matthew Salvucci
(74) *Attorney, Agent, or Firm* — Schwegman Lundberg & Woessner, P.A.

(57) ABSTRACT

This specification discloses methods and systems for generating three-dimensional models of deformable objects from two-dimensional images. According to one aspect of this disclosure, there is described a computer implemented method for generating a three dimensional model of deformable object from a two-dimensional image. The method comprises: receiving, as input to an embedding neural network, the two-dimensional image, wherein the two dimensional image comprises an image of an object; generating, using the embedding neural network, an embedded representation of a two-dimensional image; inputting the embedded representation into a learned decoder model; and generating, using the learned decoder model, parameters of the three dimensional model of the object from the embedded representation.

19 Claims, 8 Drawing Sheets

(56) References Cited

FOREIGN PATENT DOCUMENTS

| CN | 115699088 A | 2/2023 |
|---|---|---|
| KR | 102693803 B1 | 8/2024 |
| WO | WO-2020174215 A1 | 9/2020 |
| WO | WO-2021165628 A1 | 8/2021 |

OTHER PUBLICATIONS

"International Application Serial No. PCT/GB2020/050371, Written Opinion mailed Nov. 18, 2020", 11 pgs.

Ge, Liuhao, et al., "3D Hand Shape and Pose Estimation from a Single RGB Image", arxiv.org, Cornell University Library, 201 Olin Library Cornell University Ithaca, Ny 14853, (Mar. 3, 2019), 12 pgs.

Kulon, Dominik, et al., "Single Image 3D Hand Reconstruction with Mesh Convolutions", arxiv.org, Cornell University Library, 201 Olin Library Cornell University Ithaca, NY 14853, (May 4, 2019), 14 pgs.

Tran, Luan, et al., "Nonlinear 3D Face Morphable Model", 2018 IEEE/CVF/Conference on Computer Vision and Pattern Recognition, IEEE, (Jun. 18, 2018), 7346-7355.

"Chinese Application Serial No. 202080096820.9, Notification to Make Rectification mailed Sep. 9, 2022", w/o English translation, 2 pgs.

"Chinese Application Serial No. 202080096820.9, Response filed Nov. 11, 2022 to Notification to Make Rectification mailed Sep. 9, 2022", w/o English claims, 21 pgs.

"Korean Application Serial No. 10-2022-7032213, Notice of Preliminary Rejection mailed Sep. 29, 2023", w/ English Translation, 11 pgs.

Xian-Feng, Han, et al., "Image-based 3D Object Reconstruction: State-of-the-Art and Trends in the Deep Learning Era", Deep Learning-based 3D Object Reconstruction—A Survey, arXiv:1906.06543v3 [cs.CV], (Nov. 1, 2019), 27 pgs.

"European Application Serial No. 20707797.5, Communication Pursuant to Article 94(3) EPC mailed Feb. 4, 2025", 6 pgs.

Guler, Riza Alp, et al., "HoloPose: Holistic 3D Human Reconstruction In-The-Wild", CVPR, (Jun. 20, 2019), 11 pgs.

"Chinese Application Serial No. 202080096820.9, Office Action mailed Feb. 22, 2025", w/ English translation, 18 pgs.

\* cited by examiner

GENERATING THREE-DIMENSIONAL OBJECT MODELS FROM TWO-DIMENSIONAL IMAGES

CLAIM OF PRIORITY

This application is a U.S. national-phase application filed under 35 U.S.C. § 371 from International Application Serial No. PCT/GB2020/050371, filed Feb. 17, 2020, and published as WO 2021/165628 on Aug. 26, 2021, which is incorporated herein by reference in its entirety.

FIELD

This specification discloses methods and systems for generating three-dimensional models of deformable objects from two-dimensional images.

BACKGROUND

Monocular three-dimensional (3D) reconstruction of objects can facilitate a broad range of applications in human-computer interaction, augmented reality, virtual telepresence, etc. In some applications, 3D reconstructions of hands may be particularly useful, such as in automated sign language recognition/generation and augmented reality control/interactions.

Current state-of-the art methods are limited in that they do not easily generalise to samples captured in a non-laboratory environment (e.g. "in the wild"), and are often based on estimating locations of a sparse set of keypoints (e.g. hand joints and fingertip locations when generating 3D models of hands).

SUMMARY

According to one aspect of this disclosure, there is described a computer implemented method for generating a three dimensional model of deformable object from a two-dimensional image. The method comprises: receiving, as input to an embedding neural network, the two-dimensional image, wherein the two dimensional image comprises an image of an object; generating, using the embedding neural network, an embedded representation of a two-dimensional image; inputting the embedded representation into a learned decoder model; and generating, using the learned decoder model, parameters of the three dimensional model of the object from the embedded representation.

According to a further aspect of this disclosure, there is described a computer implemented method for training a learned decoder model to generate a three dimensional model of a deformable object from a two-dimensional image. The method comprises: receiving, as input to an embedding neural network, a two-dimensional training image, wherein the two dimensional training image comprises an object and is associated with predetermined parameters of a three-dimensional model of the deformable object; generating, using the embedding neural network, an embedded representation of a two-dimensional training image; inputting the embedded representation into a decoder model; generating, using the decoder model, generated parameters of the three dimensional model of the object from the embedded representation, comparing, using a loss function, generated parameters of the three dimensional model of the object to the predetermined parameters of the three dimensional model of the object associated with the two-dimensional training image; updating parameters of the decoder model in dependence on the comparison.

The parameters of the three dimensional model of the object may comprise positions of a plurality of nodes in a mesh, and wherein the loss function comprises a vertex term comparing generated positions of nodes to corresponding predetermined positions of nodes associated with the two-dimensional training image. The loss function may comprise an edge term comparing distances between generated positions of nodes to distances between corresponding predetermined positions of nodes associated with the two-dimensional training image. The predetermined parameters of a three dimensional model of the object associated with the two-dimensional training image may be derived by fitting a three dimensional object model to the two training dimensional image.

The above methods may each be combined with one or more of the following features, either alone or in combination.

The embedding neural network may comprise a residual neural network.

The three-dimensional model may comprise a mesh model and the parameters of the three dimensional model of the object may comprise mesh parameters. The decoder model may comprise a decoder neural network.

The decoder model may comprise a decoder neural network comprising one or more two-dimensional convolutional layers, and wherein parameters of the three dimensional model of a hand comprise three-dimensional co-ordinates of nodes of a mesh. The decoder neural network may comprise one or more upscaling layers.

The initial layers of the decoder neural network may comprise a fully connected layer and a reshaping layer.

The decoder model may comprise a linear layer and wherein parameters of the three dimensional model of a hand comprise three-dimensional co-ordinates of nodes of a mesh.

The deformable object may be a hand.

According to a further aspect of this disclosure, there is described a computer implemented method of generating a training dataset for training a machine learning model to generate a three-dimensional model of a deformable objects from a two-dimensional image. The method comprises: extracting a plurality of two-dimensional images from one or more sections of video data, the two dimensional image each comprising one or more deformable objects; for each of the two-dimensional images in the plurality of two-dimensional images: identifying, using a keypoint identification model, a plurality of object keypoints in the two-dimensional image; and determining parameters of a three-dimensional parametric model of an object, the parameters corresponding to the deformable object in the two-dimensional image, wherein determining the parameters comprises fitting a three-dimensional parametric model of the object to the two-dimensional image using the identified object keypoints and corresponding object keypoints in the three-dimensional parametric model; and storing, in a computer memory, the two-dimensional image and the corresponding parameters of the three-dimensional parametric model.

The one or more sections of video data may comprise one or more sections of video of use of sign language.

Fitting the three-dimensional parametric model of the object to the two-dimensional image may comprise applying an iterative optimisation procedure to an objective function, wherein the objective function comprises a reprojection term comparing locations of object keypoints identified in the two dimensional image with locations of corresponding object keypoints in a two-dimensional projection of the three-dimensional parametric model. The reprojection term may comprise a mask that applies a weighting to the corresponding object keypoints in the two-dimensional projection. The objective function may further comprise a length term comparing distances between object keypoints identified in the two dimensional image and distances between corresponding object keypoints in a two-dimensional projection of the three-dimensional parametric model. The objective function may further comprise a regularisation term penalising deviations from a predefined mean object pose.

The three-dimensional parametric model of the object may be a mesh model parametrised by parameters comprising one or more shape parameters and/or one or more pose parameters. The parameters of the three-dimensional parametric model of the object may further comprise one or more camera parameters. The corresponding object keypoints in the three-dimensional parametric model may be identified from the mesh model using a sparse regression model.

The deformable object may be a hand. The one or more sections of video data may comprise a plurality of sections of video of use of sign language, wherein the plurality of sections of video comprise the use of sign language from different sign languages. The keypoint extraction model may be a two-dimensional pose estimation model configured to identify joint positions and/or fingertip positions of hands in the two-dimensional images.

According to a further aspect of this disclosure, there is described a computer implemented method of training a machine learned model for generating a three dimensional model of an object, the method comprising the use of a training dataset generated according to the method described above.

According to a further aspect of this disclosure, there is described a computer implemented method for generating a three dimensional model of an object, the method comprising the use of a machine learned model trained using any of the training methods disclosed herein.

According to a further aspect of this disclosure, there is described apparatus comprising a processor and a memory, the memory comprising computer readable instructions that, when executed by the processor, cause the apparatus to perform any one or more of the methods disclosed herein.

According to a further aspect of this disclosure, there is described a computer program product comprising computer readable code that, when executed by a computer, causes the computer to perform any one or more of the methods disclosed herein.

BRIEF DESCRIPTION OF THE DRAWINGS

Embodiments will now be described by way of non-limiting examples with reference to the accompanying drawings, in which.

DETAILED DESCRIPTION

Example implementations provide system(s) and methods for monocular three-dimensional object model reconstruction.

Methods/systems for generating three-dimensional object models from two-dimensional images are introduced that use a neural network architecture comprising an image encoder followed by a decoder model. The methods/systems may be trained 3$o$ based on a direct three-dimensional object mesh reconstruction loss. A training dataset for use in the training may be generated automatically from videos containing example images of objects of a given type (e.g. hands). While the methods and systems used herein can be used to generate models for a wide range of object types, they are particularly suited to generating three-dimensional models of hands in images.

The methods described herein can result in a lower pose estimation error for three-dimensional object models generated from in-the-wild images when compared to current methods. The methods described herein can also outperform previous methods of object pose estimation, particularly hand pose estimation, without overfitting or tuning to a particular dataset. The methods described herein thus provide robust and accurate means of determining three-dimensional object models from two-dimensional images, from which accurate estimations of object poses can be determined. Accurate object pose information, particularly hand pose estimation, has many applications in human-computer interaction, such as automatic sign language recognition, augmented/virtual reality control etc.

Furthermore, the methods of dataset generation described herein can produce a labelled dataset of object images from raw in-the-wild hand images/video without the need for manual labelling.

In the following, the methods and systems of generating three-dimensional object models from two-dimensional images are mainly described in relation to the object being a hand, i.e. generating a 3D model of a hand from a 2D image containing a hand. However, it will be appreciated that the methods can alternatively or additionally be applied to other objects. Examples include, but are not limited to: faces; human/animal bodies and/or parts thereof; vehicle, such as cars or planes for example; and/or robots and/or robot parts. The methods and systems can be used with objects for which deformable models exist, i.e. deformable objects. A deformable object may be considered to be an object/object category whose surface can be parametrised using a mesh with a fixed/predetermined topology.

As used herein, the term "hand" is preferably used to connote a human hand. However, it may alternatively or additional be used to connote one or more of: an animal claw/paw/hand; a robotic hand or gripper; and/or appendages of fictional creatures.

Figure 1:
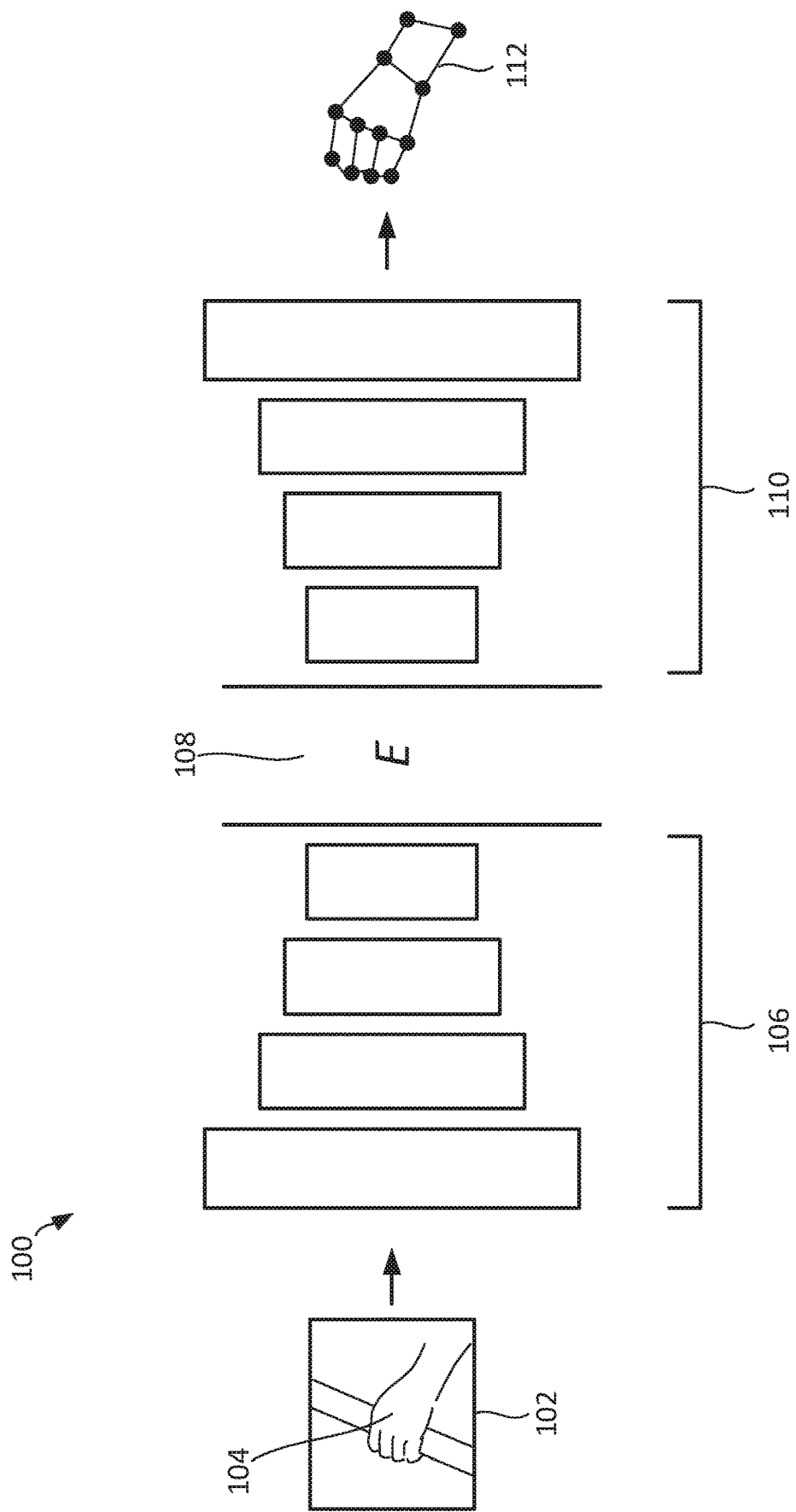
FIG. 1 shows an overview of an example method of generating a three dimensional model of an object from a two-dimensional image.

FIG. 1 shows an overview of an example method of generating a three dimensional model of an object from a two-dimensional image. In this example, the object is a hand, though may alternatively be another type of deformable object. The method 100 takes as input a 2D image 102 comprising one or more hands 104. An encoder model 106, such as an encoder neural network, processes the 2D image 102 to generate an embedding 108, E, of the image. The embedding 108 is input into a decoder model 110 (in this example, a decoder neural network) that processes the embedding 108 to generate a 3D model 112 of one or more of the hands 104 in the 2D image 102.

The two-dimensional image 102, I, comprises a set of pixel values corresponding to a two-dimensional array. For example, in a colour image, $I \in \mathbb{R}^{H \times W \times 3}$, where H is the height of the image in pixels, W is the height of the image in pixels and the image has three colour channels (e.g. RGB or CIELAB). The two dimensional image may, in some embodiments, be in black-and-white/greyscale.

The encoder neural network 106 is a model for generating an embedding (e.g. a latent representation/vector) of an input image. The encoder neural network 106 may be a neural network pre-trained for image embedding. Such a neural network may include one or more convolutional layers. The neural network may include one or more skip connections. The resulting embedding 108 may, for example, comprise a distribution over a set of image features. An example of such a neural network is a ResNet neural network, such as the ResNet-50 network. Other examples include, but are not limited to, HRNet (see "Deep High-Resolution Representation Learning for Human Pose Estimation", K. Sun et al., CVPR 2019), MobileNetV2 (see "MobileNetV2: Inverted Residuals and Linear Bottlenecks", M. Sandler et al., CVPR 2019), and EfficientNet (see "EfficientNet: Rethinking Model Scaling for Convolutional Neural Networks", M. Tan et al., ICML 2019).

The decoder model 110 takes the image embedding 108 as input and processes it to generate the output three-dimensional model 112 of the hand 104 in the input image. In embodiments where the decoder model 110 is a neural network, the image embedding is input into an input layer of the decoder neural network. The embedding 108 is then processed through a sequence of decoder neural network layers to generate the output three-dimensional model 112 of the hand 104 in the input image.

The decoder model 110 is a learned model (i.e. a trained model) that has been trained on a set of training data to generate the output three-dimensional model 112 of the hand 104 in the input image from an embedding of that image. Examples of training such a model are described below.

The decoder model 110 may comprise one or more spatial convolutional layers. The spatial convolutions of these layers may operate in pixel-space. The decoder model 110 may comprise one or more fully connected layers. For example, the initial layer may be a fully connected layer. Alternatively or additionally, the decoder model may comprise one or more upscaling layers for increasing the dimensionality of their input. In some embodiments the decoder model comprises or consists of a single linear layer.

Examples of structures of decoder neural networks/models are described in further detail below in relation to FIG. 3. In general, a neural network comprises a plurality of layers of nodes, each node associated with one or more parameters. The parameters of each node of the neural network may comprise one or more weights and/or biases. The nodes take as input one or more outputs of nodes in the previous layer. The one or more outputs of nodes in the previous layer are used by the node to generate an activation value using an activation function and the parameters of the neural network. The activation functions may comprise the ReLU activation function, though other activation functions (such as a sigmoid or tanh activation function) may alternatively or additionally be used.

The output three-dimensional model 112 comprises a three-dimensional representation of the hand 104 in the input image 102. In general, any parameters that define the three-dimensional model of a hand corresponding to the hand 104 in the input image 102 may be output by the decoder neural network 112. For example, the three-dimensional model 112 may be a mesh model, defined by a set of mesh parameters. The mesh parameters may comprise: vertex/node locations; edges defined between pairs of vertices/nodes in the mesh; and/or faces (i.e. a closed set of edges, such as a triangle face or quad face). An example of such a mesh model for a hand is the MANO model, though other mesh models may alternatively be used. In some embodiments, the output of the decoder neural network 512 may simply be locations of mesh vertices/nodes in a predefined model rather than the full mesh itself.

Figure 2:
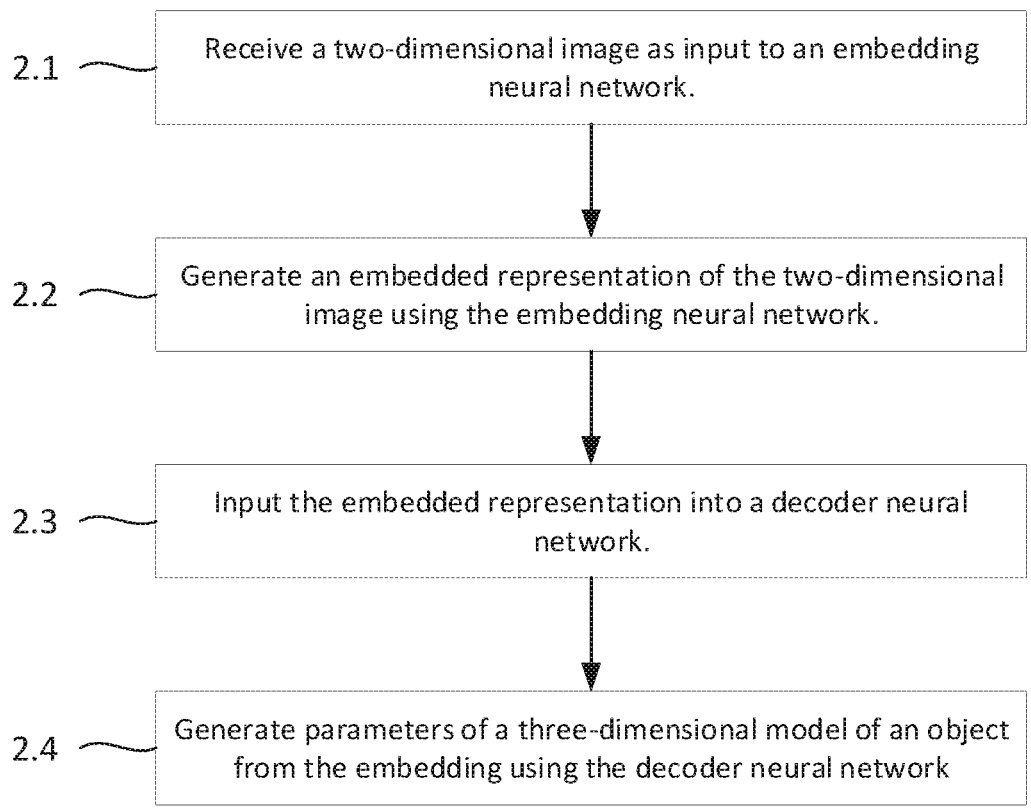
FIG. 2 shows a flow diagram of an example method of generating a three dimensional model of an object from a two-dimensional image.

FIG. 2 shows flow diagram of an example method of generating a three-dimensional model of an object from a two-dimensional image. The method may be implemented on a computer. The object may be a hand, as described above in relation to FIG. 1.

At operation 2.1, a two-dimensional image is received as input to an embedding neural network. The two dimensional image comprises one or more objects of a given type, e.g. one or more hands.

At operation 2.2, an embedded representation of the two-dimensional image is generated using the embedding neural network. The embedding neural network may comprise a residual neural network, i.e. a neural network with one or more skip connections. The embedding neural network may comprise one or more convolutional layers that each applies one or more convolutional filters to the input image and/or output of a previous layer in the embedding neural network.

At operation 2.3, the embedded representation is input into a decoder model. The decoder model may be a decoder neural network. The initial layers (e.g. one of the input layers or a layer following the input layer) of the decoder neural network may comprise a fully connected layer. The fully connected layer may be the input layer of the decoder neural network that takes the embedded representation as input and produces a feature map from it. The feature map may be defined in a pixel-like space (e.g. one or more arrays of pixel values) or in a mesh space (e.g. values are associated with mesh nodes). A reshaping layer may follow the fully connected layer to reshape the feature maps for use by subsequent layers.

At operation 2.4, parameters of a three dimensional model of a hand are generated from the embedding of the two-dimensional image using the decoder model. The three-dimensional model of the hand may be a mesh model, with the parameters being mesh parameters. For example, the mesh parameters may comprise: locations of nodes in the mesh; edges connecting pairs of nodes in the mesh; and/or mesh shapes (such as mesh triangles or mesh quadrilaterals, for example).

In some embodiments, the decoder model may comprise or consist of a single linear layer. The single linear layer can provide direct object regression to the three-dimensional model. The linear layer may comprise a matrix with learned values for the matrix elements that takes as input a vector obtained by reshaping the image embedding output from the embedding neural network.

In some embodiments, the decoder model may comprise a convolutional neural network, comprising one or more convolutional layers. The convolutional neural network may further comprise one or more upscaling layers configured to increase the dimensionality of an output of a convolutional layer.

Figure 3:
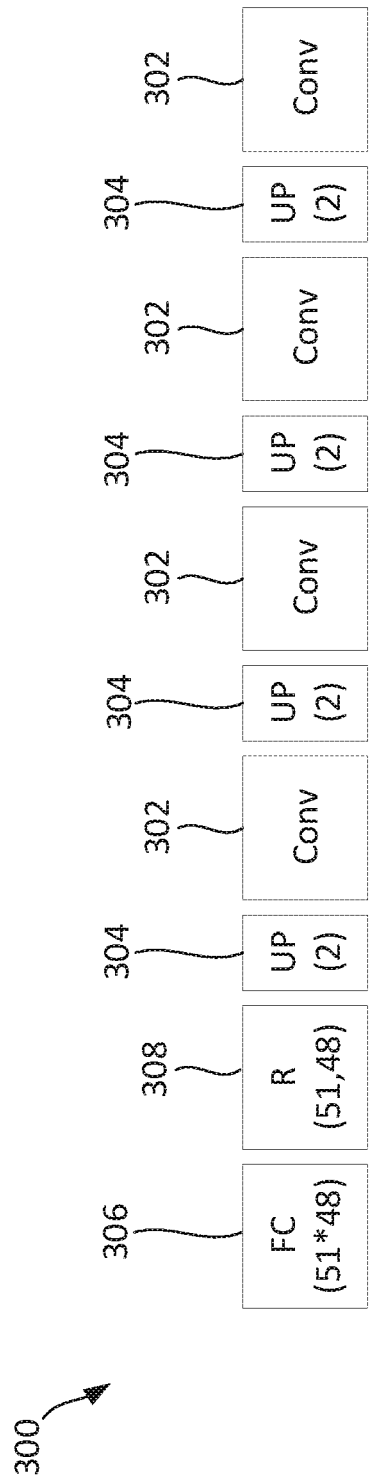
FIG. 3 shows an example of a structure of a decoder neural network.

FIG. 3 shows an example of a decoder neural network structure. The decoder neural network 300 is configured to generate a 3D mesh model of a hand from an embedding of a 2D image of a hand.

The decoder neural network may comprise one or more two-dimensional convolutional layers 302, i.e. layers that each configured to apply one or more two-dimensional convolutional filters to an array of, for example, pixel values and/or feature maps. In embodiments where such two-dimensional convolutional layers are used, the output of the decoder neural network may be a set of node/vertex coordinates for a mesh.

The decoder neural network may comprise one or more upscaling layers 304. The upscaling layers 304 are configured to increase the dimensionality of their input by a predetermined factor. In the example shown, the upscaling layers 304 upscale their input by a factor of two, though other upscaling factors may alternatively be used. The upscaling layers 304 may be deconvolutional layers.

The initial layers (e.g. one of the input layers or a layer following the input layer) of the decoder neural network may comprise a fully connected layer 306. The fully connected layer 306 may be the input layer of the decoder neural network that takes the embedded representation as input and produces a feature map from it. The feature map may be defined in a pixel-like space (e.g. one or more arrays of pixel values) or in a mesh space (e.g. values are associated with mesh nodes). In the example shown, the fully connected layer 306 outputs a (51×48)-dimensional vector.

A reshaping layer 308 may follow the fully connected layer to reshape the feature maps for use by subsequent layers. The reshaping layer 308 may convert a vector output by the fully connected layer 306 into a tensor. In the example shown, the reshaping layer 308 converts the (51×48)-dimensional vector output by the fully connected layer 306 into a 51-by-48 dimensional matrix. Other reshapings are possible, depending on the nature of the subsequent layers of the neural network 300.

In some embodiments, the output of the decoder neural network comprises or consists of three-dimensional co-ordinates of nodes of a mesh.

In some embodiments, the decoder model may be a linear regression model. The problem may be re-interpreted to one of direct regression from an image path in the 2D image to the locations of mesh vertices. In these embodiments, an embedding neural network is used as described above, with a single layer operating on the top layer of the embedding neural network block. The resulting tensor is reshaped into a D-dimensional vector, then multiplied by a matrix of dimension (N*3)×D, where N is the number of vertices in the mesh, to give the three-dimensional coordinates of the N mesh vertices. The values of the matrix elements used in the matrix may be learned, for example, using the methods described below in relation to FIGS. 5 and 6. In some embodiments, an (N*3) vector of learned parameters may also be added to the output of the matrix multiplication.

As an example, the embedding network may be a ResNet-50 network. The output 5×5×512 tensor representing the embedding is reshaped to a D=12800 dimensional vector. The reshaped vector is multiplied by a (722*3)×12800 matrix to deliver the 3D coordinates of 722 mesh vertices.

Embodiments based on the linear regression model are particularly suited to lightweight implementations on mobile devices. They do not use any specialised convolutions, such as geometric convolutions, and do not use deconvolutional based filters. Instead, they rely on generic convolutional network layers. The models can also be extended to apply to the entirety of an image in a fully convolutional manner, rather than processing individual patches.

Figure 4:
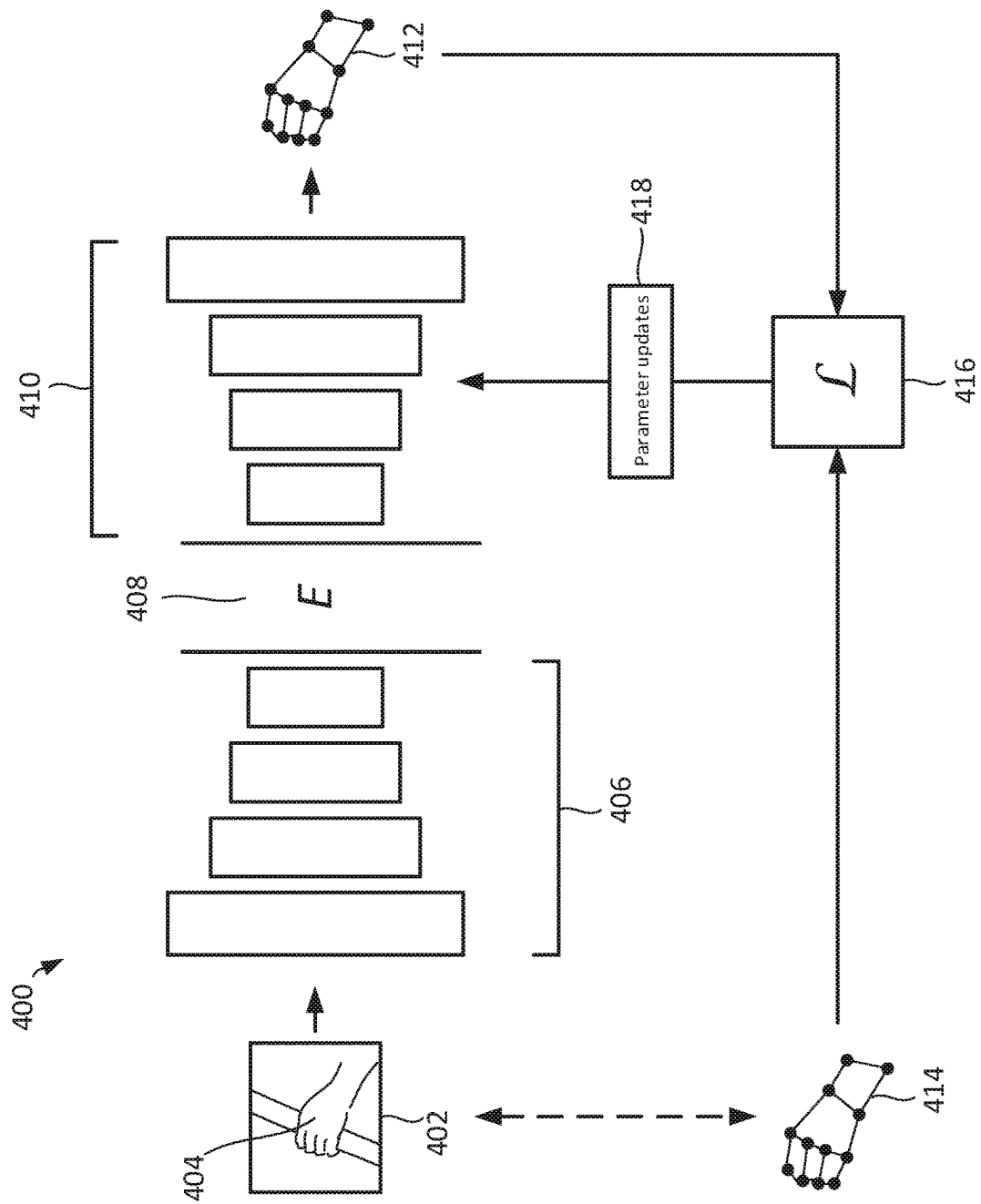
FIG. 4 shows an overview of an example method for training a model to generate a three dimensional model of an object from a two-dimensional image.

FIG. 4 shows an overview of a method 400 for training a model to generate a three-dimensional model of an object 412 from a two-dimensional image 402. In the example shown, the object 412 is a hand, though the model may alternatively be trained to generate a three-dimensional model of other object types.

Training image 402 comprising an object (in this case a hand) 404 is selected from a training dataset of images containing hands. Each training image 402 in the training dataset is associated with a predetermined (i.e. known) three-dimensional model 414 of the object 404 in the image. The training dataset may, for example, be generated using the method described below in relation to FIGS. 6 and 7. Alternatively, the training dataset may be generated manually. In general, any method of generating a dataset of images of objects with corresponding three-dimensional models may be used.

The predetermined three-dimensional model 414 of the hand may be stored as a full mesh model of a hand associated with a corresponding two-dimensional image. Alternatively, the predetermined three-dimensional model 414 of the hand may be generated from stored parameters of a parametric model that are associated with the corresponding two-dimensional image (e.g. parameters of the MANO model).

The selected image 404 is input into an embedding neural network 406. The embedding neural network 406 generates an embedding 408 of the input image 402, i.e. a latent representation of the image.

The embedding 408 is input into a decoder neural network 410 that generates a three-dimensional model of a hand from the embedding. The decoder neural network 410 may, for example, be a convolutional neural network, as described above. The three-dimensional model 412 of a hand may be a mesh model (i.e. parameters of a mesh representing the hand, such as vertex/node locations, edges, and or mesh polygons).

The generated three-dimensional model of the hand 412 is compared to the predetermined three-dimensional model of the hand 414 associated with the input image 402. The comparison may be performed by means of a loss function 416, $\mathcal{L}$, that compares properties of the generated three-dimensional model of the hand 412 to properties of the predetermined three-dimensional model of the hand 414 associated with the input image 402.

The loss function 416 may comprise a vertex term, $\mathcal{L}_{vert}$. The vertex term compares locations of vertices/nodes in the generated three-dimensional model of the object 412 to locations of vertices/nodes in the predetermined three-dimensional model of the object 414 associated with the input image 402. The vertex term may depend on differences between locations of vertices/nodes in the generated three-dimensional model of the object 412 and corresponding locations of vertices/nodes in the predetermined three-dimensional model of the object 414 associated with the input image 402. An example of such a vertex loss function term is given by:

$$\mathcal{L}_{vert} = \lambda_{vertex} |\hat{\mathcal{Y}} - \mathcal{Y}|_1$$

where $\hat{\mathcal{Y}}$ is the ground-truth mesh vertex locations (i.e. the locations of vertices/nodes in the predetermined three-dimensional model of the object 414 associated with the input image 502), $\mathcal{Y}$ is the generated mesh vertex locations (i.e. the locations of vertices/nodes in the generated three-dimensional model of the object 412 generated from the same input image 402), and $\lambda_{vertex}$ is a hyperparameter controlling the relative importance of this term in the loss function 416 when the loss function comprises a plurality of terms. The hyperparameter $\lambda_{vertex}$ may, for example, lie between 0.001 and 1, for example between 0.001 and 0.1, such as between 0.005 and 0.015, e.g. $\lambda_{vertex}$=0.001. In the above example, an L1-norm is used, though it will be appreciated that other norms may alternatively be used, such an L2 norm.

The loss function 416 may alternatively or additionally comprise an edge term, $\mathcal{L}_{edge}$. The edge term may alternatively be referred to as an "edge length preservation" component. The edge term compares lengths of edges between nodes in the generated three-dimensional model of the object 412 to lengths of edges between nodes in the predetermined three-dimensional model of the object 414 associated with the input image 502. The edge term may depend on differences between lengths of edges in the generated three-dimensional model of the object 412 and corresponding lengths of edges in the predetermined three-dimensional model of the object 414 associated with the input image 502. An example of such an edge loss function is given by:

$$\mathcal{L}_{edge} = \lambda_{edge} \sum_{(u,v) \in \varepsilon_{mesh}} \|(\hat{y}_v - \hat{y}_u) - (y_v - y_u)\|^2$$

where $\varepsilon_{mesh}$ is the set of mesh edges (e.g. a pair of nodes (u, v) defining the end points of the edge), $\hat{\mathcal{Y}}_v$ and $\hat{\mathcal{Y}}_u$ are the nodes corresponding to the endpoints of the edge (u, v) in the ground-truth mesh 514, and $\mathcal{Y}_v$ and $\mathcal{Y}_u$ are the nodes corresponding to the endpoints of the edge (u, v) in the generated mesh 412. $\lambda_{edge}$ is a hyperparameter controlling the relative importance of this term in the loss function 416 when the loss function comprises a plurality of terms. The hyperparameter $\lambda_{edge}$ may, for example, lie between 0.001 and 1, for example between 0.001 and 0.1, such as between 0.005 and 0.015, e.g. $\lambda_{edge}$=0.001. In the above example, an L2-norm is used, though it will be appreciated that other norms may alternatively be used, such an L1 norm.

A combined loss function may be given by the sum of the vertex term and the edge term, giving:

$$\mathcal{L} = \lambda_{vertex}|\hat{y} - y|_1 + \lambda_{edge} \sum_{(u,v) \in \varepsilon_{mesh}} \|(\hat{y}_v - \hat{y}_u) - (y_v - y_u)\|^2$$

In some implementations, $\lambda_{edge} = \lambda_{vertex}$. Additional terms may be included in the loss function, such as a pose estimation loss. However, it has been found that the inclusion of a pose estimation loss has limited effect on the training results, so can be omitted in some embodiments.

The loss function 416 is used to determine parameter updates 418 for the decoder model 410. For example, weights and/or biases of the decoder neural network 418 are updated based on the comparison of the generated three-dimensional model of the object 412 to the known three-dimensional model of the object 414. For example, an optimisation procedure may be applied to the loss function 416 in order to determine the parameter updates 418. Examples of such optimisation procedures include, but are not limited to, gradient descent methods, such as stochastic gradient descent, simulated annealing, momentum methods, such as Adam, and the like.

In some implementations, parameters of the encoder neural network 406 may also be updated based on the loss function 416 using any of the training methods described herein. Alternatively, the parameters of the encoder neural network 406 may be fixed during training of the decoder model 412.

In some implementations, parameter updates 418 are determined once a batch of training images 402 has been processed. An average/sum of the loss function 416 over the batch of training images may be used to determine the parameter updates 418. The batch of training images comprises a plurality of different training images 402 from the training dataset. The batch size (i.e. the number of distinct training images in a batch) may, for example be between 10 and 100 images, preferably between 25 and 50 images, such as 32 images.

The training may be iterated until a threshold condition is satisfied. The threshold condition may one or more of: a threshold number of iterations; a threshold number of training epochs (i.e. forward and backward passes through the training dataset); a threshold accuracy being obtained on a test dataset comprising two-dimensional images of hands with known three-dimensional hand models; the loss function being optimised to within a threshold value; and/or some other convergence criterion or criteria. Where a threshold number of epochs are used, the threshold number may, for example, be between 100 and 200 epochs, preferably between 125 and 175 epochs, such as 150 epochs.

The parameter updates 418 may determine based on a learning rate of the optimisation procedure used, e.g. a "step size" in gradient descent methods. The learning rate may be constant throughout the training. Alternatively, the learning rate may vary throughout the training, for example by decaying from an initial learning rate by a predetermined factor at pre-defined training epochs. As an example, the initial learning rate using an Adam optimiser may be $10^{-4}$, and decay by a factor of 0.1 at the 90-th and 120-th epochs. Other learning rate decay routines may alternatively be used.

In some implementations, the input image and/or three-dimensional models may undergo pre-processing and or post-processing. For example, the input images 402 may be augmented with randomly crops and/or random transformations (e.g. translations, rotations, scaling etc.). This can enhance the performance of the trained model on real-world examples, where input images can't be cropped based on ground truth annotations. Alternatively or additionally, the input images 502 may be normalised with the mean and standard deviation from a known image dataset, such as ImageNet. Output meshes may 412 be normalised based on statistics calculated on a subset of the known meshes 414.

Figure 5:
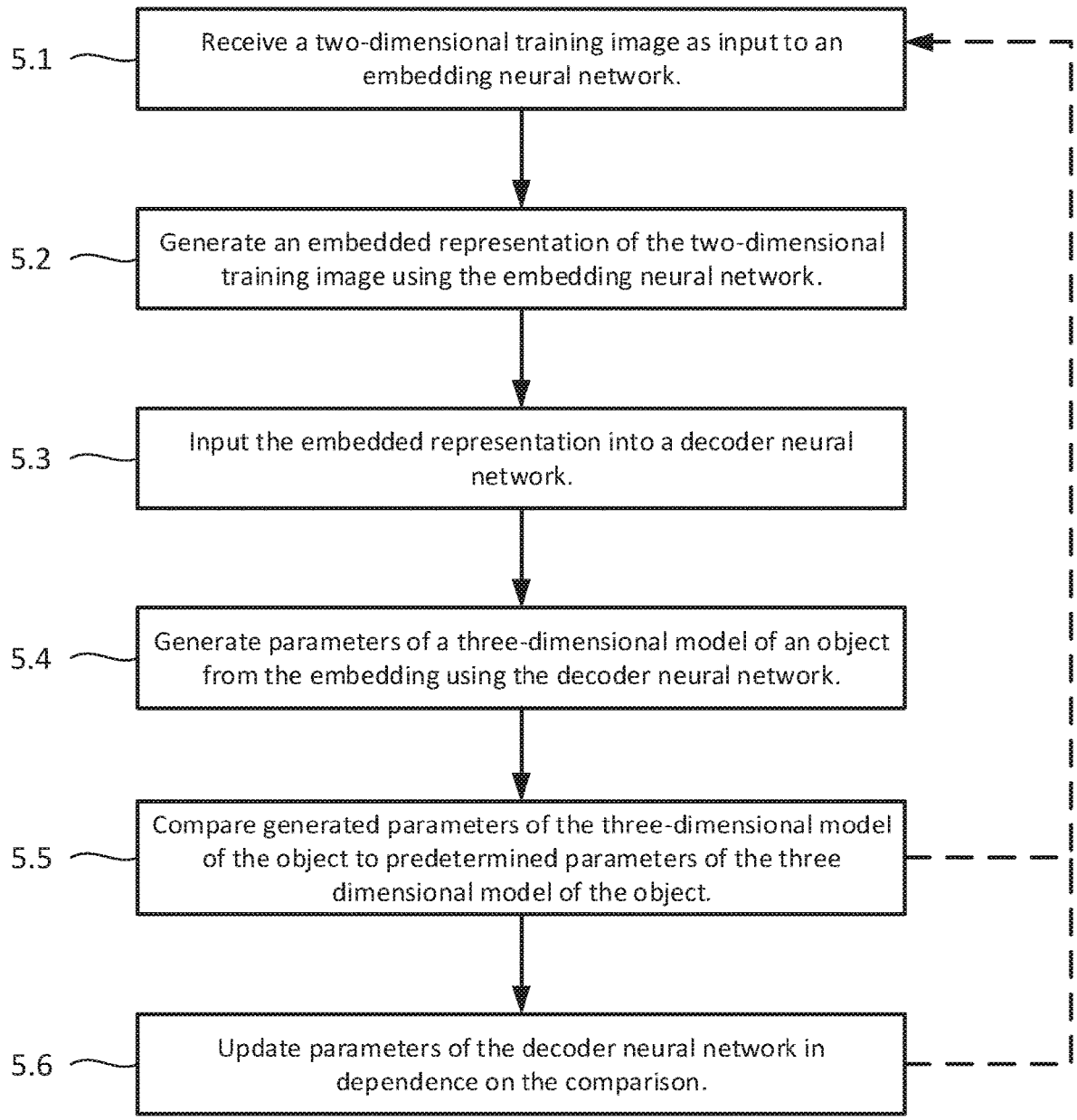
FIG. 5 shows a flow diagram of an example method for training a model to generate a three dimensional model of an object from a two-dimensional image.

FIG. 5 shows a flow diagram of an example method for training a neural network to generate a three-dimensional model of an object of a given type from a two-dimensional image. The method may be implemented on a computer. The object type may be a hand.

At operation 5.1, a two-dimensional training image is received as input to an embedding neural network. The two-dimensional training image comprises an image of an object of a given type, and is associated with a corresponding predetermined three-dimensional model of the object in the image. The predetermined three-dimensional object model may have been derived by fitting a three dimensional object model to the two training dimensional image.

At operation 5.2, an embedding of the two-dimensional training image is generated using the embedding neural network, as described above in relation to FIGS. 1 and 2. The embedding neural network may be a residual neural network.

At operation 5.3, the embedded representation is input into a decoder model. The decoder model comprises a parameterised model, such as a decoder neural network or linearised regression model, which can be trained using machine learning techniques.

At operation 5.4, a three dimensional model (e.g. parameters of a three-dimensional model) of the hand in the two-dimensional image is generated using the decoder model, as described above in relation to FIGS. 1-3.

At operation 5.5, the generated three-dimensional model is compared to the predetermined three-dimensional model of the object (i.e. parameters of the generated three-dimensional model are compared to parameters of the predetermined three-dimensional model). The comparison is performed using a loss function (which may also be referred to as an objective function).

The loss function may comprise a vertex term comparing generated positions of nodes/mesh vertices to corresponding predetermined positions of nodes/mesh vertices in the predetermined model associated with the two-dimensional training image. The loss function may alternatively or additionally comprise an edge term comparing distances between generated positions of nodes/mesh vertices to distances between corresponding predetermined positions of nodes/mesh vertices in the predetermined three-dimensional model associated with the two-dimensional training image.

At operation 5.6, parameters of the decoder model are updated in dependence on the comparison. The parameters may be updated using an optimisation routine, such as stochastic gradient descent, etc. Operations 5.1-5.5 may be iterated a plurality of times, each with a different training image from a training batch. The parameters of the decoder model updated based on an expectation value of the loss/objective function taken over the training images of a batch.

Figure 6:
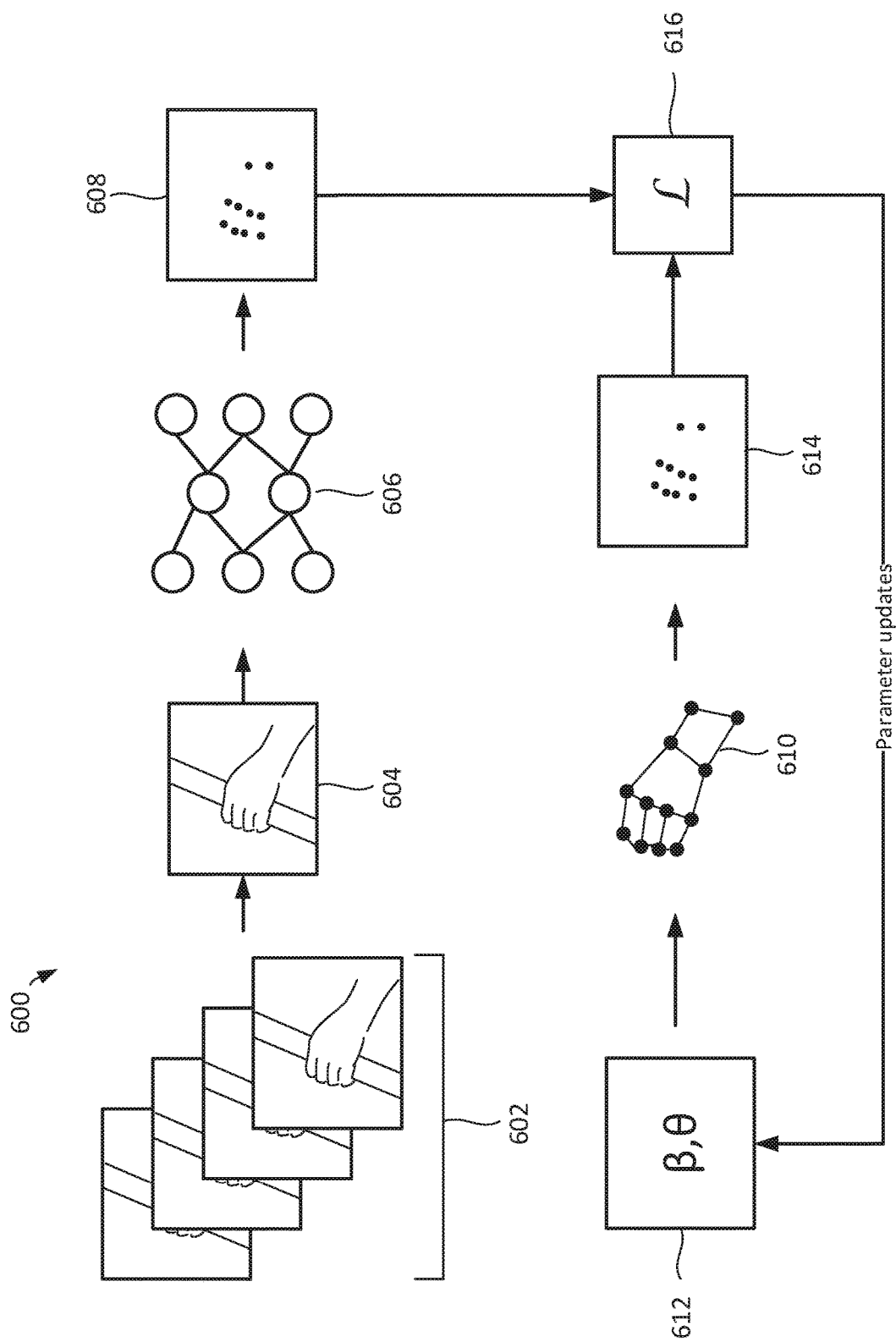
FIG. 6 shows an overview of an example method for generating a training dataset for training a machine learning model to generate a three-dimensional model of an object from a two-dimensional image.

Operations 5.1 to 5.6 may be iterated until a threshold condition is satisfied. The threshold condition may be a threshold number of training epochs. The threshold condition may comprise one or more convergence criteria defined, for example, on a set of validation images with corresponding predetermined three-dimensional models. FIG. 6 shows an overview of an example method for generating a training dataset for training a machine learning model to generate a three-dimensional model of a hand from a two-dimensional image. The method may be performed by a computer. A training set generated using the methods described in relation to FIGS. 6 and 7 may be used as a training dataset/validation dataset in the methods described in relation to FIGS. 4 and 5.

Training models for three-dimensional object reconstruction may often be limited by the availability of labelled images that can be used in the training. Labelled images are often manually annotated, and/or captured in laboratory conditions, and thus may not capture the full range of object positions/poses etc. that occur in-the-wild.

Video data can provide multiple images of objects of a particular type. For example, when the objects of interest are hands, videos of sign language use may provide two-dimensional hand images in a wide range of realistic poses. Such videos may be obtained from publically available video repositories, such as internet video sites.

Automatically fitting three-dimensional object models to two-dimensional images extracted from such video data can result in a training dataset that more accurately reflects in-the-wild object poses. Training a three-dimensional object generation model on such training data can result in a more accurate model generation model when compared to manually labelled images and/or images captured in lab conditions.

The method 600 comprises receiving a section of video data 602, the video data comprising a plurality of frames, and extracting one or more two-dimensional images 604 comprising an object of a given type (e.g. in the example shown, the object type is hands). The video data 602 may be taken from a publically available source of video data, such as a video hosting website. This can help ensure that the video data 602 represents "real-world" examples of images of the object type. In embodiments where the object type is a hand, the video data may comprise one or more segments of video data depicting the use of a sign language.

Each extracted image is fed into a keypoint identification model 6o6 that identifies a plurality of object keypoints 608 in the input image. The keypoint extraction model 606 may, for example, be a pre-trained neural network. The pre-trained neural network may comprise one or more convolutional layers. An example of such a model is OpenPose, though other models trained to identify keypoints of a given object type in an image may alternatively be used.

Locations, Y, of the identified keypoints 608 are used to iteratively fit a three-dimensional deformable model (i.e. a parametric model) of the object to the image. For example, a deformable model of a hand (such as the MANO model) may be iteratively fitted to images of hands.

The deformable model predicts N mesh vertices on the surface of the object through a differentiable function, $M(\beta, \theta)$, that maps shape, $\beta$, and pose, $\theta$, parameters 612 to an instance of the model represented by an N-vertex mesh. In some embodiments, the deformable model may also predict locations a plurality of keypoints, K, of the model. In embodiments where the object type is hands, the keypoints may, for example, represent joints of the hand. The pose parameters, $\theta$, may relate to angles of the joints in the hand. For example, in the MANO model, the pose parameters represent K=16 joints of the hand, and $\theta \in \mathbb{R}^{K \times 3}$.

The deformable model may additionally take as input one or more camera parameters.

The camera parameters may, for example, comprise a scaling parameter, s, and a translation parameter, $\vec{T}_\delta \in \mathbb{R}^3$. Global orientation may be included in the pose parameters, $\theta$. In such an example, the deformable model may be represented as:

$$M(\beta, \theta, \vec{T}_\delta, s; \phi): \mathbb{R}^{|\beta| \times |\theta| \times |\vec{T}_\delta| \times |s|} \to \mathbb{R}^{N \times 3}$$

where $\phi$ is a set of leaned model parameters.

To prevent unrealistic object poses, such as impossible joint angles in a hand, the pose parameters may be constrained to lie on the convex hull of some pre-computed cluster centres. For example, where the pose parameters represent angles in the K joints of a hand, C Euler-angle clusters $P^1_i, \ldots, P^C_i$, can be obtained via k-means for each joint, i. The pose variables for each joint can then be represented as $$\theta_i = \frac{\sum_{c=1}^C \exp(w^c) P_i^c}{\sum_c^C \exp(w^c)}.$$

This constrains the pose angles, $\theta_i$, to take plausible values, while allowing optimisation over unconstrained variables $w^c$. The constrained angles may be represented in terms of a parameter matrix $w \in \mathbb{R}^{K \times C}$ while allowing global orientation to be unrestricted.

The three-dimensional model 610 may be initialised using an initial set of shape and pose parameters. The three-dimensional model may be used to determine one or more model keypoints 614 (i.e. keypoints of the model) corresponding to the keypoints 608 identified in the two-dimensional image 604. The model keypoints 614 may comprise the K keypoints predicted by the differentiable model M. The model keypoints may additionally or alternative comprise one or more further keypoints, F. In a hand model, the K keypoints may comprise joints (e.g. K=16 in the MANO model), and the F further keypoints may comprise the five fingertips of a hand. A sparse regression model $\mathcal{J} \in \mathbb{R}^{N \times (K+F)}$ may be used to regress the model keypoints 714 from the N-vertex mesh, delivering a hand pose, $J \in \mathbb{R}^{(K+F) \times 3}$:

$$J(\beta, \theta, \vec{T}_\delta, s) = \mathcal{J}^T M(\beta, \theta, \vec{T}_\delta, s; \phi).$$

This model is iteratively fitted to the keypoints 608 identified in the two-dimensional image 604 by comparing the model keypoints 614 to the identified image keypoints 608. The comparison may be performed using an objective function 614. The fitting may be accomplished by applying an iterative optimisation procedure to the objective function 616, such as gradient descent.

The objective function may comprise a 2D reprojection term, $E_{2D}$. The 2D reprojection term compares locations of the model keypoints 714 in a two-dimensional projection of the three dimensional model to the locations of the identified image keypoints 608. A norm, such as a L2 or L1 norm, may be used as the objective function.

A mask, $\Lambda_{2D}$, may be applied to the projection of the three-dimensional model to reduce the influence of some keypoints and enhance the effects of others. For example, in a hand model the mask may reduce the influence of the metacarpophalangeal joints (MCP, i.e. the base of each finger), and enhance the influence of the fingertips and wrist. The MCP joints locations may be multiplied by a predetermined factor less than 1, such as between 0.2 and 0.9, or between 0.5 and 0.8, for example 0.7. The fingertips may be multiplied by a predetermined factor greater than 1, such as between 1.1 and 2.5, or 1.6 and 1.8, for example 1.7. The wrist may be multiplied by a predetermined factor greater than 1, such as between 1.5 and 3.5, or 2 and 3, for example 2.5.

An example of a 2D reprojection term may be represented symbolically as:

$$E_{2D}(\beta, w, \vec{T}_\delta, s) = \|\Lambda_{2D}(\Pi_K(J(\beta, P(w), \vec{T}_\delta, s))) - Y\|^2$$

where Y is the locations of the identified image keypoints 608, $\Pi_K$ is an intrinsic camera projection to 2D and $\Lambda_{2D}$ is a mask.

The objective function may further comprise a feature length term, $E_f$. In embodiments where the object type is a hand, this may be referred to as a "bone loss". The feature length term ensures that the lengths of edges in the object skeleton tree, $\varepsilon$, are preserved. The feature length term compares the lengths of edges between keypoints in the 2D reprojection of the three dimensional model to the lengths of edges between identified keypoints 608 in the two-dimensional image 604. A norm, such as a L2 or L1 norm, may be used as the objective function.

An example of feature length term may be represented symbolically as:

$$E_f\left(\beta, w, \vec{T}_\delta, s\right) = \sum_{(i,j) \in \varepsilon} \|(J_{2D_j} - J_{2D_i})^2 - (Y_j - Y_i)^2\|^2$$

where the sum is taken over pairs of points (i,j) in the object skeleton tree, $\varepsilon$, and $J_{2D_i} = \Pi_K(J(\beta(w), \vec{T}_\delta, s))_i$ is the location of feature i in the 2D projection of the three dimensional model.

In some embodiments, the objective function may further comprise a regularisation term, $E_{reg}$. The regularisation term penalises deviations from a mean object pose, and can help ensure realistic deformations. Assuming that the parameters $\theta$ and $\beta$ are defined such that the mean object pose corresponds to $\theta=0$ and $\beta=0$, an example of a regularisation term is given by:

$$E_{reg}(\beta, \theta) = \Lambda_\theta \|\theta\|^2 + \lambda_\beta \|\beta\|^2$$

where $\lambda_\beta$ and $\lambda_\theta$ are experimentally chosen hyperparameters. In some embodiments, $\lambda_\theta$ may be less than 1, such as lying in the range 0.01 and 0.5, such as between 0.05 and 0.2, for example 0.1. In some embodiments, $\lambda_\beta$ may be greater than 100, such as lying in the range 100 and 10000, such as between 500 and 1500, for example 1000.

The objective function may comprise one or more of the reprojection term, the feature length term and the regularisation term. The objective of the optimisation procedure may be to minimise the following objective:

$$\left\{\beta^*, w^*, \vec{T}^*_\delta, s^*\right\} = \arg\min_{\beta, w, \vec{T}_\delta, s} (E_{2D} + E_f + E_{reg}).$$

As an example, the Adam optimiser may be used to apply an optimisation procedure to the objective function, Different learning rates may be used for the camera, pose and shape parameters (for example, $10^{-2}$, $10^{-2}$ and $10^{-5}$ respectively). The learning rate may decay by a predetermined factor after a predetermined number of iterations of the optimisation routine. For example, the learning rate may decay by a factor of 0.95 every 500 iterations. During some sequences of iterations, one or more of the parameter sets may be frozen. For example, in an embodiment where the object is a hand, a first number of iterations may apply the optimisation procedure over camera parameters and global orientation, with the joint set is reduced to a wrist and MCP joints excluding thumb. The first number of iterations may lie between 500 and 3000 iterations, such as between 1000 and 2000 iterations, for example 1500 iterations. Afterwards, the optimisation procedure may be applied over all parameters for a second number of iterations. The second number of iterations may lie between 500 and 4000 iterations, such as between 2000 and 3000 iterations, for example 2500 iterations.

As mentioned above, the data collection method may collect object images from a publically available video source (e.g. YouTube™). The method may, for example, iterate over a list of video links, download a video, extract frames, run OpenPose, fit a three-dimensional model (e.g. MANO for hands) to each frame, and select a small subset of filtered samples. The depth of the projected mesh may be proportional to the ratio of standard deviations between X coordinates of the projected mesh and its world position. Sanity checks may be performed by thresholding total OpenPose confidence score, per-joint confidence score, and/or the mean squared error between projected model (e.g. MANO) joints and Open-Pose predictions normalized by the distance from the camera.

As an example, to create a training dataset, one-hundred-and-two videos are taken and at most 500 samples per video that meet the threshold conditions are randomly selected. In embodiments relating to hands, most of the samples may cover sign language conversations. These may be performed by people from a wide variety of nationalities and/or ethnicities. Some videos may include, for example, a hundred people signing a common phrase to a webcam all over the world. The validation and test sets may cover, for example, seven videos with an empty intersection of subjects with the training set. Test videos may be selected to be diverse and challenging, and may for example include conversations captured outdoor, dance poses, and sign languages from different regions (e.g. American, Australian, and Taiwanese sign languages). Additionally, the method may be performed on the COCO dataset, with, for example, 7,048 hand images extracted for training. A combined training set and validation and test sets may be created by combining the extracted COCO images with the images extracted from the videos.

Figure 7:
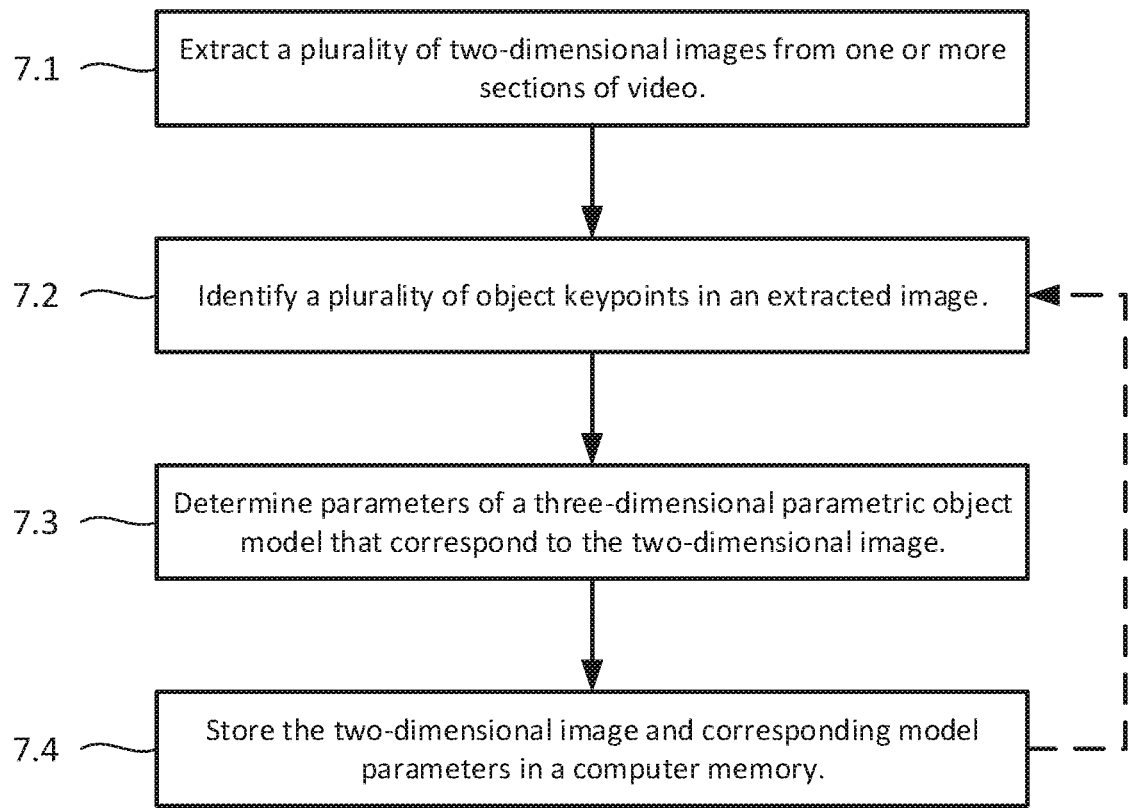
FIG. 7 shows a flow diagram of an example method for generating a training dataset for training a machine learning model to generate a three-dimensional model of an object from a two-dimensional image.

FIG. 7 shows a flow diagram of an example method for generating a training dataset for training a machine learning model to generate a three-dimensional model of an object from a two-dimensional image.

At operation 7.1, a plurality of two-dimensional images is extracted from one or more sections of video data, the two dimensional image each comprising one or more objects of a given type, e.g. hands. The video data may be downloaded from an external repository, such as a publically available video streaming/sharing website. In embodiments where the object type is hands, the video may comprise one or more sections of video depicting the use of sign language.

At operation 7.2, for a given one of the extracted images, a plurality of object keypoints is identified in the two-dimensional image using a keypoint identification model. For example, the keypoint extraction model may be a two-dimensional pose estimation model configured to identify joint positions and/or fingertip positions of hands in the two-dimensional images. An example of such a model is OpenPose, though any keypoint extraction model that can identify object/hand keypoints may alternatively be used.

At operation 7.3, parameters of a three-dimensional parametric object model that correspond to the two-dimensional image are determined. Determining the parameters comprises fitting a three-dimensional parametric object model to the two-dimensional image using the identified object keypoints and corresponding object keypoints in the three-dimensional parametric object model.

The three-dimensional parametric hand model may be defined by a set of parameters comprising shape parameters, $\beta$, and pose parameters, $\theta$. The parameters may also comprise scale and position parameters of a camera viewing the mesh. The model uses these parameters to generate a three-dimensional hand mesh via a differentiable function. An example of such a model is the MANO model, though other parametric hand models may alternatively be used.

Keypoints of the three dimensional hand mesh may be identified using a sparse regression model. The keypoints may be projected onto the image plane and compared to the keypoints detected in the two-dimensional image, for example using a loss/objective function. The loss/objective function may comprise a re-projection term comparing locations of hand keypoints identified in the two dimensional image with locations of corresponding hand keypoints in a two-dimensional projection of the three-dimensional parametric model. A mask applying a weighting to the corresponding hand keypoints in the two-dimensional projection may be used in the re-projection term. The loss/objective function further comprises a bone length term comparing distances between hand keypoints identified in the two dimensional image and distances between corresponding hand keypoints in a two-dimensional projection of the three-dimensional parametric model. The loss/objective function further comprises a regularisation term penalising deviations from a predefined mean hand pose.

Based on the comparison, parameters of the three-dimensional hand model may be updated, for example using an optimisation procedure. Examples of such optimisation procedures include, Adam and/or other gradient descent methods.

At operation 7.4, said two-dimensional image and the corresponding parameters of the three-dimensional parametric hand model are stored in a computer memory. The two-dimensional image and the corresponding parameters of the three-dimensional parametric hand model may be stored as part of a training dataset, a validation dataset or a test dataset.

Operations 7.2 to 7.4 may be repeated for each of the extracted images (or a subset of the total extracted images). A subset of the extracted images satisfying some threshold condition may be used. For example, the threshold condition may be that a confidence score that the image contains an object of a given type (e.g. a hand) is above a threshold value (e.g. 90%).

The training set generated in this way may be used in any of the training methods described herein.

Figure 8:
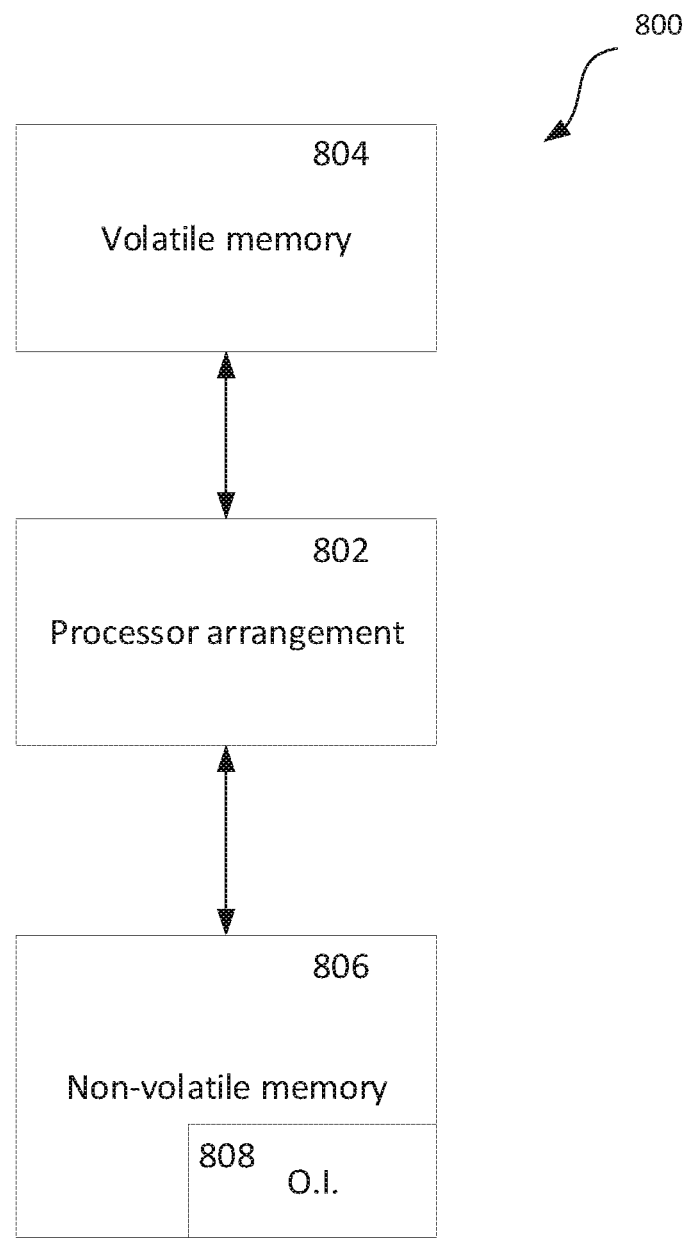
FIG. 8 shows an example of a system/apparatus for performing the methods disclosed herein.

FIG. 8 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 800 comprises one or more processors 802. The one or more processors control operation of other components of the system/apparatus 800. The one or more processors 802 may, for example, comprise a general purpose processor. The one or more processors 802 may be a single core device or a multiple core device. The one or more processors 802 may comprise a Central Processing Unit (CPU) or a Graphical Processing Unit (GPU). Alternatively, the one or more processors 802 may comprise specialised processing hardware, for instance a RISC processor or programmable hardware with embedded firmware. Multiple processors may be included.

The system/apparatus comprises a working or volatile memory 804. The one or more processors may access the volatile memory 804 in order to process data and may control the storage of data in memory. The volatile memory 804 may comprise RAM of any type, for example Static RAM (SRAM), Dynamic RAM (DRAM), or it may comprise Flash memory, such as an SD-Card.

The system/apparatus comprises a non-volatile memory 806. The non-volatile memory 806 stores a set of operation instructions 808 for controlling the operation of the processors 802 in the form of computer readable instructions. The non-volatile memory 806 may be a memory of any kind such as a Read Only Memory (ROM), a Flash memory or a magnetic drive memory.

The one or more processors 802 are configured to execute operating instructions 808 to cause the system/apparatus to perform any of the methods described herein. The operating instructions 808 may comprise code (i.e. drivers) relating to the hardware components of the system/apparatus 800, as well as code relating to the basic operation of the system/apparatus 800. Generally speaking, the one or more processors 602 execute one or more instructions of the operating instructions 808, which are stored permanently or semi-permanently in the non-volatile memory 806, using the volatile memory 804 to temporarily store data generated during execution of said operating instructions 808.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 8, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The invention claimed is:

1. A computer implemented method, comprising:
    receiving, as input to an embedding neural network that comprises one or more encoder parameters, a two-dimensional training image, wherein the two-dimensional training image comprises an object and is associated with a predetermined three-dimensional model that comprises vertices;
    generating, using the embedding neural network, a first embedded representation of the two-dimensional training image;
    inputting the first embedded representation into a decoder model, the decoder model comprising a regression model that comprises one or more decoder parameters;
    generating, using the decoder model, a generated three-dimensional model of the object based on the first embedded representation, the generated three-dimensional model comprising vertices;
    comparing, using a loss function, the generated three-dimensional model of the object to the predetermined three-dimensional model associated with the two-dimensional training image;
    updating the one or more encoder parameters and the one or more decoder parameters of the decoder model in dependence on the comparing: receiving, as input to the embedding neural network, a two-dimensional object image, wherein the two-dimensional object image comprises an image of the object;
    generating, using the embedding neural network, a second embedded representation of a two-dimensional object image;
    inputting the second embedded representation of the two-dimensional object image into the decoder model that comprises the regression model; and
    generating, using the decoder model, a resulting three-dimensional model of the object from the second embedded representation, the resulting three-dimensional model comprising a plurality of nodes in a mesh;
    wherein the loss function comprises a vertex term and an edge term, the vertex term comprising first differences between vertices of the generated three-dimensional model and vertices of the predetermined three-dimensional model, the edge term comprising second differences between edge lengths of the generated three-dimensional model and edge lengths of the predetermined three-dimensional model.

2. The method of claim 1, wherein the generating the generated three-dimensional model of the object, the comparing the generated three-dimensional model of the object to the predetermined three-dimensional model, and the updating the one or more encoder parameters and the one or more decoder parameters of the decoder model in dependence on the comparing are repeated until a threshold condition is satisfied.

3. The method of claim 1, wherein the vertices of the predetermined three-dimensional model of the object associated with the two-dimensional training image are derived by fitting a three-dimensional object model to the two-dimensional training image.

4. The method of claim 1, wherein the decoder model comprises a decoder neural network comprising one or more two-dimensional convolutional layers, and wherein the generated three-dimensional model corresponds to a hand, the generated three-dimensional model comprises three-dimensional co-ordinates of the plurality of nodes of the mesh.

5. The method of claim 4, wherein the decoder neural network comprises one or more upscaling layers.

6. The method of claim 4, wherein initial layers of the decoder neural network comprise a fully connected layer and a reshaping layer.

7. The method of claim 1, wherein the decoder model comprises a linear layer and wherein the generated three-dimensional model corresponds to a hand, the generated three-dimensional model comprises three-dimensional co-ordinates of the plurality of nodes of the mesh.

8. The method of claim 1, further comprising:
    generating a training dataset for training the decoder model to generate a generated three-dimensional model of a deformable object from the two-dimensional object image, the generated three-dimensional model comprising generated parameters that comprise a plurality of nodes in a mesh; the generating the training dataset comprising:

extracting a plurality of two-dimensional training images from one or more sections of video data, each two-dimensional training image of the plurality of two-dimensional training images comprising one or more deformable objects;

for the each two-dimensional training image in the plurality of two-dimensional training images:

identifying, using a keypoint identification model, a plurality of object keypoints in the each two-dimensional training image;

determining parameters of a three-dimensional parametric model, the parameters corresponding to the deformable object in the each two-dimensional training image, wherein determining the parameters comprises fitting the three-dimensional parametric model of the object to the each two-dimensional training image using the identified object keypoints and corresponding object keypoints in the three-dimensional parametric model; and storing, in a computer memory, the each two-dimensional training image and the corresponding parameters of the three-dimensional parametric model.

9. The method of claim 8, wherein the one or more sections of video data comprises one or more sections of video of use of sign language.

10. The method of claim 8, wherein fitting the three-dimensional parametric model of the object to the each two-dimensional image comprises applying an iterative optimization procedure to an objective function, wherein the objective function comprises a reprojection term comparing locations of object keypoints identified in the each two-dimensional training image with locations of corresponding object keypoints in a two-dimensional projection of the three-dimensional parametric model.

11. The method of claim 10, wherein the reprojection term comprises a mask that applies a weighting to the corresponding object keypoints in the two-dimensional projection.

12. The method of claim 10, wherein the objective function further comprises a length term comparing distances between object keypoints identified in the each two-dimensional training image and distances between corresponding object keypoints in a two-dimensional projection of the three-dimensional parametric model.

13. The method of claim 10, wherein the objective function further comprises a regularization term penalizing deviations from a predefined mean object pose.

14. The method of claim 8, wherein the three-dimensional parametric model of the object is a mesh model parametrized by parameters comprising one or more shape parameters and/or one or more pose parameters.

15. The method of claim 13, wherein the parameters of the three-dimensional parametric model of the object further comprise one or more camera parameters.

16. The method of claim 14, wherein the corresponding object keypoints in the three-dimensional parametric model are identified from the mesh model using a sparse regression model.

17. A computing apparatus, comprising:

a processor;

a memory, the memory comprising computer readable instructions that, when executed by the processor, cause the computing apparatus to perform operations comprising:

receiving, as input to an embedding neural network that comprises one or more encoder parameters, a two-dimensional training image, wherein the two-dimensional training image comprises an object and is associated with a predetermined three-dimensional model that comprises vertices;

generating, using the embedding neural network, a first embedded representation of the two-dimensional training image;

inputting the first embedded representation into a decoder model, the decoder model comprising a regression model that comprises one or more decoder parameters;

generating, using the decoder model, a generated three-dimensional model of the object based on the first embedded representation, the generated three-dimensional model comprising vertices;

comparing, using a loss function, the generated three-dimensional model of the object to the predetermined three-dimensional model associated with the two-dimensional training image;

updating the one or more encoder parameters and the one or more decoder parameters of the decoder model in dependence on the comparing;

receiving, as input to the embedding neural network, a two-dimensional object image, wherein the two-dimensional object image comprises an image of the object;

generating, using the embedding neural network, a second embedded representation of a two-dimensional object image;

inputting the second embedded representation of the two-dimensional object image into the decoder model that comprises the regression model; and generating, using the decoder model, a resulting three-dimensional model of the object from the second embedded representation, the resulting three-dimensional model comprising a plurality of nodes in a mesh;

wherein the loss function comprises a vertex term and an edge term, the vertex term comprising first differences between vertices of the generated three-dimensional model and vertices of the predetermined three-dimensional model, the edge term comprising second differences between edge lengths of the generated three-dimensional model and edge lengths of the predetermined three-dimensional model.

18. The computing apparatus of claim 17, wherein the generating the generated three-dimensional model of the object, the comparing the generated three-dimensional model of the object to the predetermined three-dimensional model, and the updating the one or more encoder parameters and the one or more decoder parameters of the decoder model in dependence on the comparing are repeated until a threshold condition is satisfied.

19. A non-transitory computer readable storage medium comprising instructions that when executed configure hardware processing circuitry to perform operations comprising:

receiving, as input to an embedding neural network that comprises one or more encoder parameters, a two-dimensional training image, wherein the two-dimensional training image comprises an object and is associated with a predetermined three-dimensional model that comprises vertices;

generating, using the embedding neural network, a first embedded representation of the two-dimensional training image;

inputting the first embedded representation into a decoder model, the decoder model comprising a regression model that comprises one or more decoder parameters;

generating, using the decoder model, a generated three-dimensional model of the object based on the first embedded representation, the generated three-dimensional model comprising vertices;

comparing, using a loss function, the generated three-dimensional model of the object to the predetermined three-dimensional model associated with the two-dimensional training image;

updating the one or more encoder parameters and the one or more decoder parameters of the decoder model in dependence on the comparing;

receiving, as input to the embedding neural network, a two-dimensional object image, wherein the two-dimensional object image comprises an image of the object;

generating, using the embedding neural network, a second embedded representation of a two-dimensional object image;

inputting the second embedded representation of the two-dimensional object image into the decoder model that comprises the regression model; and generating, using the decoder model, a resulting three-dimensional model of the object from the second embedded representation, the resulting three-dimensional model comprising a plurality of nodes in a mesh;

wherein the loss function comprises a vertex term and an edge term, the vertex term comprising first differences between vertices of the generated three-dimensional model and vertices of the predetermined three-dimensional model, the edge term comprising second differences between edge lengths of the generated three-dimensional model and edge lengths of the predetermined three-dimensional model.

* * * * *

UNITED STATES PATENT AND TRADEMARK OFFICE
CERTIFICATE OF CORRECTION

PATENT NO. : 12,340,467 B2
APPLICATION NO. : 17/760424
DATED : June 24, 2025
INVENTOR(S) : Kulon et al.

Page 1 of 1

It is certified that error appears in the above-identified patent and that said Letters Patent is hereby corrected as shown below:

In the Claims

In Column 18, Line 9, in Claim 1, delete "comparing:" and insert --comparing;¶-- therefor In Column 19, Line 52, in Claim 15, delete "claim 13," and insert --claim 14,-- therefor Signed and Sealed this
Fourteenth Day of October, 2025

John A. Squires
*Director of the United States Patent and Trademark Office*